INVENTORS
CLAUDE H. CHILD
ROBERT O. CASE JR.
BY
Allan Rothenberg
ATTORNEY

3,185,982
Patented May 25, 1965

3,185,982
MONOPULSE RECEIVER SYSTEM
Robert O. Case, Jr., La Habra, and Claude H. Child, Paramount, Calif., assignors to North American Aviation, Inc.
Filed Dec. 1, 1961, Ser. No. 157,308
8 Claims. (Cl. 343—16)

This invention relates to a signal receiver or amplifier, and more particularly to a single channel receiver for monopulse signal systems.

Tracking and armament control applications of monopulse signal systems such as monopulse radars conventionally employ three types of information: (1) a sum signal representing the sum of four signals from each of four antenna apertures or horns, (2) an azimuth difference signal, and (3) an elevation difference signal. These three types of signals are employed by a monopulse computer in the computation of tracking angles and range information.

Utilization of the range, azimuth and elevation signals by a first control computer in an armament system application requires that these three signals be amplified to a suitable power level, without the introduction of differential gain and phase distortion between them.

Conventional receivers employed with monopulse radar equipment consist of three separate equipments or channels, one for each of the three types of information required (i.e., the sum signal, azimuth difference signal, and elevation difference signal), as described in U.S. Patent 2,933,980 issued to Moore et al. on April 26, 1960, particularly in FIG. 3 of such patent. Each channel or equipment is required to maintain close tolerances on its relative gain and phase characteristics relative to the other two channels in order that the computed results from the monopulse computer based on such data be free from distortion. Also, the increased number of components for such a three channel receiver represent a greater degree of complexity and unreliability than that associated with a single channel. Further, in an airborne application, such a three-channel receiver represents a greater weight penalty than that associated with a single channel receiver. Such comparative considerations are meaningful, however, only if a specific form of single channel receiver capable of performing the same functions as those of a three-channel receiver may be realized. Therefore, a broad object of this invention is to provide a single channel monopulse receiver for applications, capable of providing amplification of a sum signal, azimuth difference signal and elevation signal separately and concurrently.

If these three signals are to be sent through a single amplifier channel, they must be separable at the output by reason of distinguishing either frequency or time characteristics. Time can be used as a means of identifying each of the three signals procured through a single amplifier. For example, in one method, each of the azimuth difference and elevation difference signals could be delayed differentially with respect to each other and to the range or sum signal, amplified, and then restored to its proper position with respect to the sum signal, such that the signals in the time domain would be of the form $\Sigma(t)$, $\Delta A_z(t-t_1)$ and $\Delta El(t-t_2)$ where $\Sigma(t)$, $\Delta A_z(t)$ and $\Delta El(t)$ signify sum, azimuth difference and elevator difference signals respectively as functions of time, and where $t_1$ and $t_2$ represent separate time differentials or delays. However, a disadvantage of this method is the resultant deterioration in range resolution by the amount $\Delta T = ct_2$ where $\Delta T$ is the resolution deterioration amount, $c$ is the velocity of electromagnetic energy or light, and $t_2$ is the larger of the two time delays employed. Thus, the effect on range resolution is slightly greater than that of tripling the transmitted pulse width.

Another method of time multiplexing involves sequential sampling of the three channels either on a pulse-to-pulse basis or during the time of the pulse, which sampling is called pulse commutation. If pulse commutation is used, two-thirds of the available information in each channel is lost with a resultant coarsening of the tracking information. If commutation is carried out during a pulse, two-thirds of the power available in each channel is lost with a resulting degradation in system sensitivity.

Many other methods of time multiplexing may be devised, but all suffer from the disadvantage of loss of information or sensitivity or both. Because of the failings of time-multiplexing, the device of this invention seeks to employ other methods of signal identification in connection with single channel amplification of the three signals. Two such other means of signal identification are phase identification means and frequency identification means. Accordingly, it is a general object of the invention to provide a single receiver monopulse system for concurrently and continuously processing a sum signal, an azimuth difference signal and an elevation difference signal, all having a similar carrier.

In the device of this invention, frequency separation can be readily achieved through complex multiplication (or modulation) and demodulation by either of two means: (1) frequency translation or multiplication by the term, $e^{\pm jwt}$, or (2) cosine multiplication or multiplication by the term ($e^{jwt} \pm e^{-jwt}$), where:

$e$ = base of natural or Naperian logarithms
$j$ = complex operator notation
$w$ = translating frequency, in radians/sec.
$t$ = time in seconds Such multiplication may be performed by the use of modulating means and filters. However, angular resolution of the azimuth and elevation tracking angle signals, $\Delta A_z$ and $\Delta El$ respectively, are deteriorated if undue noise or cross-coupling between information channels exists. Therefore, a proper combination of modulating frequency and filter transfer functions is required in order to prevent deterioration of such angular resolution.

Frequency duplexing or modulation by the first described means, $e^{\pm jwt}$, using two single side band systems, one for one of the two difference frequency and difference signal combinations and the other for the other difference frequency and difference signal combination, provides two new difference signals translated in the frequency domain relative to each other and relative to the range or sum signal:

$$\Delta El(t) e^{jwt} = F(\omega_0 + \omega_1)$$
$$\Delta A_z(t) e^{-jwt} = F(\omega_0 - \omega_1)$$

Where:

$\omega_0$ = carrier frequency and $\omega_1$ = modulating frequency

These two signals can be amplified in a linear amplifier, but separation requires the use of sharp or narrow bandpass filters prior to multiplication by $e^{\pm jwt}$ Frequency duplexing or modulation by the second described means, $e^{jwt} \pm e^{-jwt}$, essentially involves the use of cos $\omega t$ multipliers:

$$e^{+jwt} + e^{-jwt} = \cos wt + j \sin wt + \cos wt - j \sin wt$$
$$= 2 \cos wt$$

$$e^{+jwt} - e^{-jwt} = \cos wt + j \sin wt - \cos wt + j \sin wt$$
$$= +j2 \sin wt = 2 \cos \left(w_1 + \frac{\pi}{2}\right)$$

The distinguishing feature accomplished by such multiplier set is the quadrature relation between them. Hence, three signals having a similar carrier may be distinguished: A range signal can be distinguished from the two difference signals by means of a single common translation of the two difference signals in the frequency domain, and the difference signals can be further distinguished from each other by means of a quadrature time phase relation between them.

The method of phase identification as a means of signal identification is particularly useful to distinguish between signals of like frequency. Such means involves separating two signals of like frequency by multiplying one signal by $$e^{j\frac{\pi}{2}}$$

thereby shifting one signal in quadrature time phase relation to the other signal. Such means of phase duplexing may be accomplished by the use of a phase shifter to process one of two signals of like frequency before they are combined in a single amplifier and then using phase detectors to distinguish each from the other.

In carrying out the principles of this invention in accordance with a preferred embodiment thereof, there is provided: a monopulse system including three output signal sources having a similar carrier, a single receiver-amplifier responsively connected to said sources. First and second complex multiplication means are interposed between said receiver-amplifier and said first and second source, respectively. Because of the insertion of the multiplication means, the single receiver includes the limitation of having a bandwidth $\Delta f_1$ in cycles per second equal to $$\omega_1 + \frac{2}{T}$$

centered about the common carrier frequency $\omega_0$, where $\omega_1$ is the modulating frequency in radians per second of the multiplication means and T is the duration in seconds of a rectangular pulse of the monopulse system. Also provided are first, second and third, bandpass output filters, each having a bandwidth in cycles per second equal to $$\frac{2}{T}$$

centered about a desired center frequency such as the carrier frequency $\omega_0$. First and second demodulating means are interposed between the output of the single receiver-amplifier and said first and second output filters, respectively.

By means of the above described arrangement, two of three monopulse signals are coded such that all of them may be concurrently amplified by a single common receiver, then distinguished from each other and separately recovered. In this way, relative gain and phase shift errors, between the signals arising from tolerance differences between separate receiver-amplifiers is avoided.

An object of this invention therefore is to provide means for minimizing differential gain and phase errors between the three signals of a monopulse system having a sum, first difference and second difference signal channels.

Another object of this invention is to provide a single receiver-amplifier monopulse system for three signal channels having improved reliability and reduced equipment bulk.

A further object of this invention is to provide means exclusive of time-sharing means, cooperating with a single receiver amplifier for distinguishing three monopulse signals having a similar carrier.

Yet another object of this invention is to provide single receiver means for processing a sum, first difference, and second difference monopulse signals with a minimum of cross-talk therebetween.

Yet a further object of this invention is to provide single receiver means for processing a single difference and reference sum monopulse signals with a minimum of cross-talk therebetween.

Still another object of this invention is to provide means for minimizing cross-talk in a single receiver monopulse system without requiring the use of close-tolerance components.

These and other objects of the invention will become apparent from the following description taken in connection with the accompanying drawings in which.

In the drawings like reference characters refer to like parts.

Figure 1:
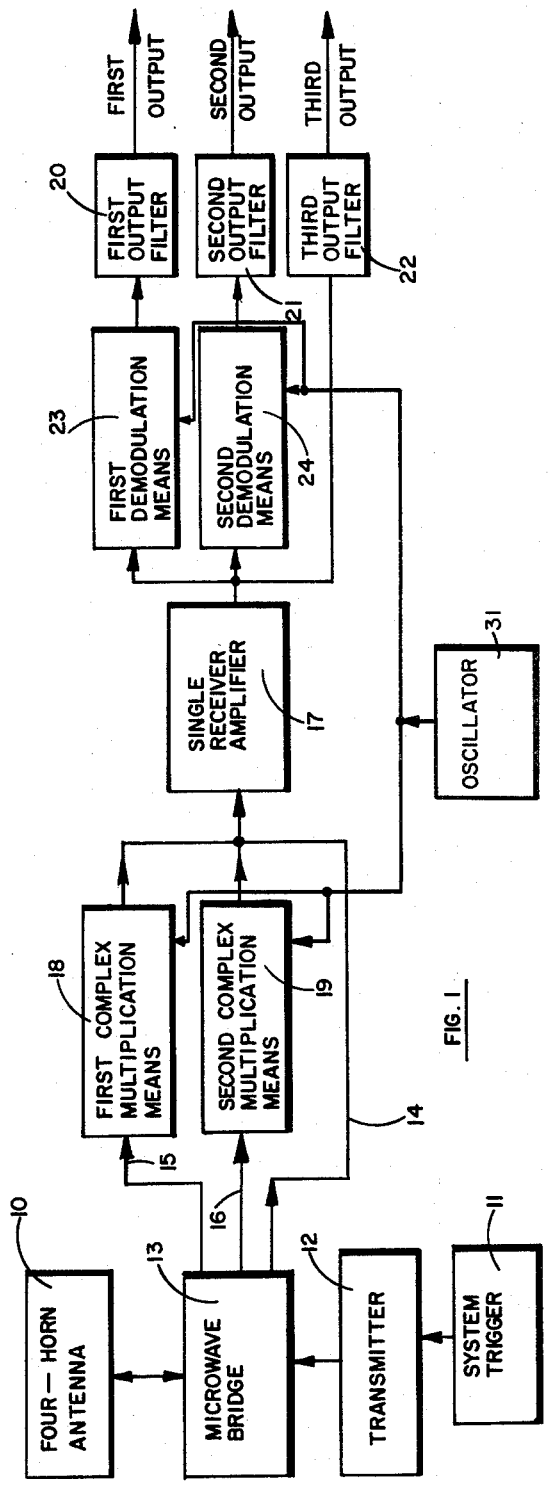
FIG. 1 is a functional block diagram of a monopulse radar system employing the principles of this invention.

Referring to FIG. 1, there is illustrated a functional block diagram of a monopulse radar system employing the principles of this invention. The radar system includes a four horn antenna 10 which may be of the conventional type such as that employed in the monopulse system described in U. S. Patent 2,933,980 issued to J. R. Moore et al. April 26, 1960. Synchronized from a system trigger 11, a transmitter 12 generates pulses of energy of uniformly fixed duration in a suitable frequency band such as, for example, between 8.2 and 12.4 megacycles per second, although other frequencies may be used.

The transmitter pulsesa re fed to antenna 10 through a microwave bridge combination 13, which bridge also receives the pulse echoes from the antenna for processing and transmission to the sum channel and two different channels of the monopulse receiver. The microwave bridge 13 supplies the additively combined energy (e.g., the in-phase components of the pulse echoes from the four horns of antenna 10) to a sum channel 14; and supplies the subtractively combined pulse echoes received by the two pairs of elevation lobes (e.g., the pair of upper antenna horns versus the pair of lower horns) to the elevation difference channel 15. Similarly, the subtractively combined pulse echoes received by the two pairs of azimuth lobes (e.g., the pair of left antenna horns versus the pair of right antenna horns) are supplied to the azimuth difference channel 16. Such microwave bridge combination may comprise waveguide "magic tees" or "rat races," and are well-known in the art, as described in "Introduction to Monopulse" McGraw-Hill, 1959, and U.S. Patent 2,933,980. Although the use of the device is explained in connection with an amplitude comparison type monopulse system, the device of the invention is equally applicable to both amplitude and phase comparison type monopulse systems, or systems employing a combination of amplitude and phase comparison.

Further, the principles of the invention are not restricted in application to radar systems, but are equally applicable to other angular sensing signal devices employing monopulse signal techniques such as sonar systems, passive interferometers and the like.

The output signal on each of channels 14, 15, and 16 is fed to a single common receiver-amplifier 17. Interposed between single receiver and channels 15 and 16 are complex multiplication means 18 and 19, respectively, and to be more particularly described herein as a combination of frequency and/or phase modulation for coding signals having a similar carrier. Elements 18 and 19 are commonly responsive to a source 31 of a periodic modulating signal.

Because of the difference frequency characteristics between the three inputs to single channel receiver-amplifier 17, such amplifier is required to have a larger pass-band than that associated with each of the three conventional receiver-amplifiers of the prior art. The criterion for such bandwidth is expressed as $$\Delta f = \frac{\omega_1}{\pi} + \frac{2}{T}$$

where:

$\Delta f$ = bandwidth in cycles per second
$\omega_1$ = modulating frequency in radians/sec. of the multiplication means
$T$ = duration in seconds of a rectangular pulse of the monopulse system Achieving such a bandwidth imposes no difficult design requirements upon the receiver design. The means of constructing such amplifiers with a desired bandwidth is well-known in the art; therefore, amplifier 17 is illustrated in functional block diagram form only. The output of single receiver-amplifier 17 is severally fed to first, second and third output filters 20, 21, and 22, all comprising like components similarly arranged. The function of third output filter 22, for example, is to distinguish and pass the sum signal component of the combined output from amplifier 17. For this reason filter 22 is designed to have a transfer function responsive to pulse echo energy of the particular pulse width and carrier frequency employed by the sum signal input to amplifier 17, and to be capble of rejecting the modulated difference signal passed by amplifier 17. The ideal frequency response transfer function $h(\omega)$ in the frequency domain, approximated by such filter, is:

$$h(\omega) = H(\omega) e^{j\omega t_d}$$

Where:

$H(\omega) = K$ (a constant) for $-\omega_{co} < \omega < +\omega_{co}$
$H(\omega) = 0$ for $|\omega| > \omega_{co}$ $\omega_{co} = \frac{2\pi}{T}$, the cut-off frequency in radians per second $t_d$ = time delay of the filter system in seconds, the center of the bandpass being centered about a desired center frequency, such as the carrier frequency $\omega_0$ for the device of FIG. 1.

For example, if the signals presented to the filter were in a phase sensitive demodulated form, the carrier frequency having been removed and only the signal envelope remaining, the center frequency of the bandpass would be zero. If, however, the signals were presented to the filter as modulated carrier signals, then the center frequency of the bandpass region would be shifted and constructed to be equal to the carrier frequency $\omega_0$ of such signals.

First and second demodulation means 23 and 24 are interposed between the output of amplifier 17 and first and second output filters 20 and 21 respectively, and commonly responsive to periodic signal generator 31. The function of demodulation means 23 and 24 is to distinguish that signal component of the amplifier output which has been subjected to first and second complex multiplication means 19 and 18 respectively.

Even though the output from each of demodulation means 23 and 24 may contain components of all three of the sum and two difference monopulse signals, only the first difference signal component in the output of first demodulation means 23 will occur at the same IF frequency as the unmodulated sum signal component appearing at the input to third output filter 22. Similarly, only the second difference signal component in the output of second demodulating means 24 will occur at the same frequency (I.F.) as the unmodulated sum signal component appearing at the input to filter 22. Accordingly, each of such demodulated signals are then processed by a separate one of filters 20 and 21, which filters are similar to filter 22, such that only that demodulated difference signal corresponding to the input to an associated one of the modulators 18 and 19 is passed by such filter, and the other two signal components present are rejected. The design of such filters is well-known in the art and is treated in the literature, for example, at page 484 of Communication Network, vol. II by E. C. Guilleman (McGraw-Hill).

Figure 2:
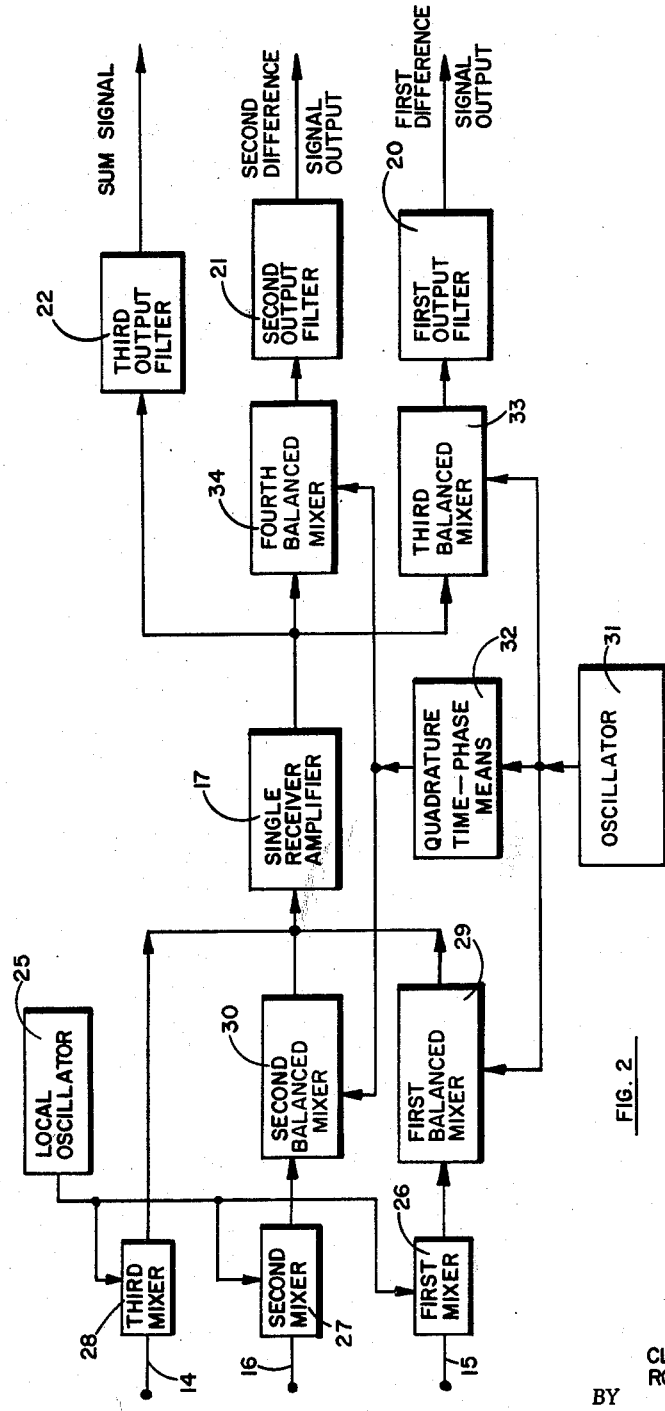
FIG. 2 is a functional block diagram of a first embodiment of this invention.

Referring to FIG. 2, there is illustrated a block diagram of a first embodiment of this invention. A single receiver-amplifier 17 is responsively connected to the sum, first difference and second difference signal channels 14, 15, and 16 of a monopulse system. There is also provided IF means comprising local oscillator 25 cooperating with each of balanced mixers 26, 27, and 28 which are interposed between receiver 17 and the first difference, and second difference and sum channels 15, 16, and 14 respectively as is usual in the art. The purpose of elements 25, 26, 27, and 28 is to convert the input signals to an IF frequency $\omega_c$ to enable the use of conventional IF strip techniques in the design of amplifier 17, and does not constitute an aspect of the invention. Such devices are well known in the art, as is to be seen from U.S. Patent No. 2,914,762 issued November 24, 1959, to T. A. O. Gross et al.; particularly elements 32, 33, and 34 in FIG. 1 of such patent.

There is also provided means for commonly translating the two difference signals in the frequency domain by an amount $\omega_1$ relative to the sum signal, such means being comprised of first and second cosine multipliers 29 and 30 interposed between amplifier 17 and first balanced mixer 26 and second balanced mixer 27 respectively, both of said multipliers being responsively connected to a cosine signal generator 31. Periodic function signal generator 31 may be comprised of an oscillator or other means well known in the art for producing a component signal corresponding to the time function $$\cos \omega_1 t = \frac{e^{+j\omega t} - e^{-j\omega t}}{2}$$

where $\omega_1$ is the common translating frequency.

Each of first and second cosine multipliers 29 and 30 are preferably similar to the other in construction and arrangement, and may be comprised of balanced modulators connected as balanced mixers for shifting the IF frequency $\omega_c$ of the two IF difference signals $F_1(\omega_c)$ and $F_2(\omega_c)$ by an amount equal to the frequency $\omega_1$ of signal generator 31. Such devices and applications thereof are well known to those skilled in the art as shown for example in U.S. Patent No. 2,965,896 issued to P. M. Wright et al. December 20, 1960, for a frequency modulated radar system, and are therefore illustrated in block diagram form only. Such application to a given signal results in two signal components, one component shifted in frequency by an amount $-\omega_1$ and another shifted by $+\omega_1$. Such upper and lower side band characteristic of a difference signal so processed provides means for distinguishing it from the sum signal. Each of the two difference signals so processed will display like side band characteristics as to be indistinguishable from each other.

Because of the spectral content of the several input signals to amplifier 17, representing the three monopulse signals, the IF strip comprising amplifier 17 requires a bandwidth slightly larger than is usually required in the prior art as will be hereinafter explained more fully.

Quadrature time phase means 32 is interposed between periodic function signal generator 31 and second multiplier 30 in FIG. 2 for providing a time-phase quadrature relation between the outputs from first and second multipliers 29 and 30. Such quadrature time phase means is well known in the art, as is to be seen from the above mentioned U.S. Patent No. 2,914,762, particularly element 41 of FIG. 1 of that patent. The purpose of providing a quadrature relation between the outputs from elements 29 and 30 is to provide means for distinguishing the two outputs from each other.

The output of single amplifier 17 is severally fed to first, second and third output filters 20, 21, and 22, all comprising like components similarly arranged. The function of third output filter 22, for example, is to distinguish and pass the IF signal component (e.g., the sum signal) of the combined output from amplifier 17, and reject other components of such output.

Third and fourth cosine multiplier means 33 and 34 are interposed between the output of amplifier 17 and first and second output filters 20 and 21 respectively, said third multiplier being responsively connected to quadrature time phase means 32. Each of third and fourth cosine multipliers 33 and 34 are preferably similar to the other and also similar to first and second multipliers 29 and 30 in construction and arrangement, being comprised of balanced modulators having push-pull input to which the output from amplifier 17 is applied and a single ended input to which the modulating signal from element 31 is applied. The output from each of third and fourth cosine multipliers will contain an IF frequency component of only the first and second difference signal respectively and a frequency-shifted component of the sum signal. The sum signal is frequency-shifted above and below from the IF frequency due to the frequency modulating action of each of cosine multipliers 33 and 34. However, an IF component of only a separate one of the two difference signals appears at the output of either of multipliers 33 and 34. This phenomena arises from the synchronized or in-phase relation between first and third multipliers 29 and 33, which assures that third multiplier 33 distinguishes and recovers a component of the first difference signal undistorted and shifted back to the IF frequency, while the synchronized quadrature driving relation between third and fourth multipliers 33 and 34 assures that the third multiplier will reject an IF component of the second difference signal.

The functioning of fourth multiplier 34 may be similarly explained, whereby it is to be understood and appreciated that of the components of the output of the fourth multiplier, only the second difference signal occurs at the IF frequency. It is to be further appreciated that in being designed to pass IF signals, the first and second filter will only pass the first and second difference signal respectively, and will substantially reject all other signal components. Therefore, the device of FIG. 2 provides single monopulse receiver means for amplifying and distinguishing the monopulse signals from three separate channels of a monopulse system.

A monopulse signal having a carrier frequency $\omega_c$ also contributes energy to the frequency spectrum at frequencies other than $\omega_c$ due to the effect of the rectangular pulse parameters, namely the pulse duration $\tau$ and the pulsing period T (reciprocal of the pulse repetition rate F in cycles per second). The frequency spectrum $g(\omega)$ of such signal will consist of:

$$g(\omega) = \sum_{\eta=1}^{\infty} \frac{\sin \frac{\eta \pi \tau}{T}}{\frac{\eta \pi \tau}{T}}$$

where $$\frac{\eta}{T} = \text{an integer}$$

Letting $$\mu = \frac{\eta \pi \tau}{T} \text{: for } K\frac{\eta \tau}{T} < 2$$

the function $$\frac{\sin \mu}{\mu}$$

has negative values.

For $$m\left(\frac{\eta}{T}\right) = m(\eta F) = \frac{m}{T}$$

in the increment from $m=2$ to $m=3$, the function is again positive and the sign changes alternately for each integral multiple of $\pi$, being even for odd multiples of $\pi$ and odd for even multiples of $\pi$. Thus, it is seen that the sign of the amplitude function of harmonics of $$\eta F = \frac{\eta}{T}$$

will invert at $m(\eta F)$, where $m = \ldots -3, -2, -1, +1, 2, 3 \ldots$.

The process of multiplication by cosine $\omega_1$ will transform the spectra to first and second spectral functions which are centered about $(\omega_c - \omega_1)$ and about $(\omega_c + \omega_1)$ respectively. No other effect will occur for a linear system. If, for purposes of illustration, the multiplier frequency $$f_1 = \frac{\omega_1}{2\pi}$$

is chosen to occur at $$m(\eta F) = \frac{1}{T}$$

the central position of the first and second spectral functions will occur at $$-\frac{2}{T} \text{ and } +\frac{2}{T}$$

respectively. The amplitude functions of a sum signal having a carrier $\omega_c$ and of a difference signal having a carrier shifted in frequency by an amount $\pm \omega_1$ is shown in FIG. 3.

Figure 3:
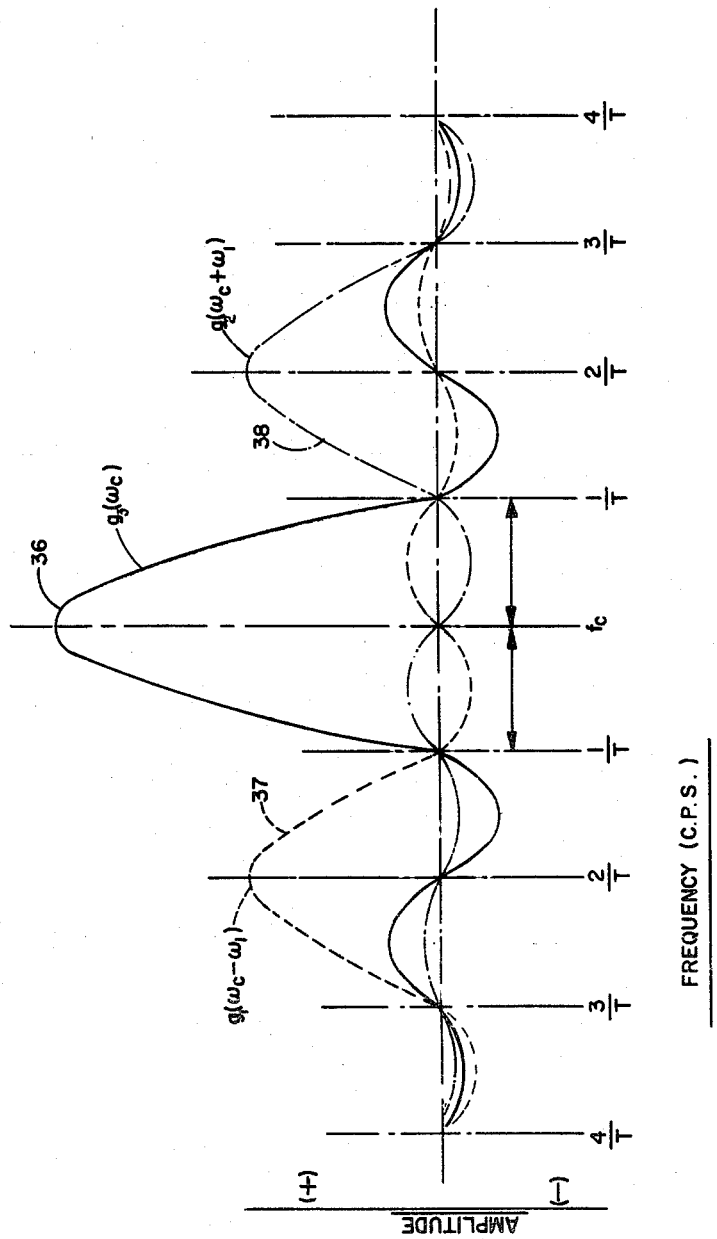
FIG. 3 is a frequency response diagram of the spectral content of the three monopulse channel signals summed at the input to receive 17 in the device of FIG. 2.

Referring to FIG. 3, there is illustrated a frequency response diagram showing the amplitudes and sense of the spectral content of three monopulse signal components having a rectangular pulse characteristic of duration $\tau$ and a period T. Curve 36 represents a signal component having a carrier frequency $\omega_c$, curve 37 represents a signal component having a carrier frequency translated or shifted by an amount $(-\omega_1)$, and curve 38 represents a signal component having a carrier frequency shifted by an amount $(+\omega_1)$, where $$f_1 = \frac{\omega_1}{2\pi} = \frac{2}{T}$$

An examination of FIG. 3 shows that a bandwidth $$\Delta f = \frac{\omega_1}{\pi} + \frac{2}{T}$$

for element 17 of FIG. 2 would be adequate to transmit the multiplied or frequency-translated difference signals, as well as for transmitting the (unshifted) sum signals. The purpose of such receiver bandwidth limitation is to assure necessary signal transport, while avoiding unnecessary introduction of noise and cross-coupling between signal channels.

Where the complex multiplier frequency $\omega_1$ used in the device of FIG. 2, is selected as $$\frac{2\pi}{T}$$

it is to be further appreciated from FIG. 3 that the harmonics of the sum signal generated by the output cosine multipiers 33 and 34 are compensating. In otherwords, when sum signal component $F_3(\omega_c)$ from amplifier 17 is processed through either one of elements 33 and 34, it is frequency translated by the modulating action of such multiplier to a new first and second frequency:

$$F_3(\omega) = \tfrac{1}{2} F_3(\omega_c - \omega_1) + \tfrac{1}{2} F_3(\omega_c + \omega_1)$$

which frequencies correspond to a frequency shift or $$-\frac{2}{T} \text{ and } +\frac{2}{T}$$

respectively of FIG. 3. Hence, while third cosine multiplier 33 shifts the center of the spectra for the first difference signal to $\omega_0$, the sum signal now consists of two spectral components, one centered at $$-\frac{2}{T}$$

(curve 37) and the other centered at $$\frac{2}{T}$$

(curve 38), the sum of which components cancel out in the region of $f_c$ (e.g., the region between $$-\frac{1}{T} \text{ and } +\frac{1}{T}$$

of FIG. 3). Accordingly, cross-talk in the difference signal outputs of FIG. 2 due to sum signal components would be minimized by proper selection of the cosine multiplier frequency $\omega_1$ for the periodic function signal generator.

Similarly $$\left(\text{when the complex multiplier frequency } \omega_1 \text{ is selected as}\frac{2\pi}{T}\right)$$

it is to be further appreciated from FIG. 3 that the harmonics of the first and second difference signal generated by first and second multipliers 29 and 30 respectively are similarly compensating. For example, when a first difference signal is processed through element 29 of FIG. 2, it is frequency translated by the modulating action of such multiplier to a new first and second frequency:

$$F_1(\omega) = \tfrac{1}{2}F_1(\omega_c - \omega_1) + \tfrac{1}{2}F_1(\omega_c + \omega_1)$$

which frequencies correspond to a frequency shift of $$-\frac{2}{T} \text{ and } +\frac{2}{T}$$

respectively of FIG. 3. Hence, the first difference signal now consists of two spectral components, one centered at $$-\frac{2}{T}$$

(curve 37) and the other centered at $$+\frac{2}{T}$$

(curve 38) the sum of which components tend to cancel out in the region of $$\omega_0 + \frac{1}{T}$$

(the passband region of output filter 22). A similar effect occurs for the second difference signal processed by second multiplier 30. Accordingly, crosstalk in the sum signal output of FIG. 2 due to difference signal components would also be minimized by the proper selection of the modulating frequency $\omega_1$.

The minimizing of crosstalk in each of the first and second difference output signals due to components of the other of the two difference signals is achieved by the quadrature time-phase means 32 employed in the illustrated embodiments of FIG. 2, as previously described.

The concept described above and illustrated in the embodiment of FIG. 2 is not limited to processing only three monopulse signals, but may be employed to process a single difference signal and a reference sum signal for improving gain and phase tracking between them, and having reduced crosstalk by suitable selecting $$\frac{\omega_1}{2\pi} \text{ equal to } \frac{2}{T}$$

Figure 5:
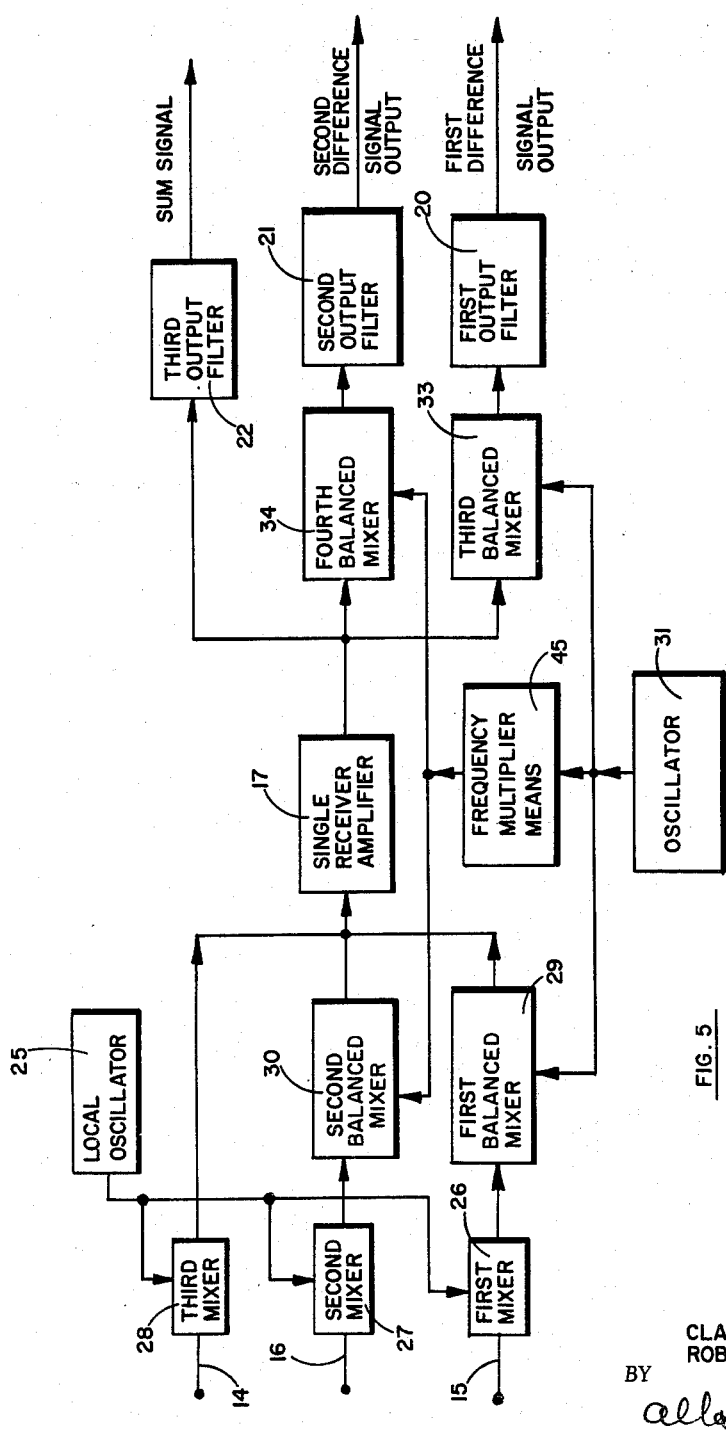
FIG. 5 is a functional block diagram of another alternative embodiment of the invention.

Further, the quadrature time phase means employed in FIG. 2 is not restricted to the phase shift means described, but could also take the form of an even harmonic generator or frequency multiplier or the like for generating a multiplier signal being an even multiple of the frequency output of the periodic function generator 31, as shown in FIG. 5.

Referring to FIG. 5, there is illustrated an alternative embodiment of the device of FIG. 2 comprising like components similarly arranged, but for the substitution of frequency multiplier means 45 for phase shift element 32. Such frequency multipliers may be constructed by means well known to those skilled in the art to provide a multiplier signal having a frequency which is an even multiple of the output of element 31. In this way, the same relation of self-cancelling harmonics is achieved for the modulated second difference signal in the frequency region $$-\frac{1}{T} \text{ to } +\frac{1}{T}$$

of FIG. 3. However, such an embodiment would necessarily require an increased bandwidth for receiver 17, and is therefore, not to be preferred.

Figure 4:
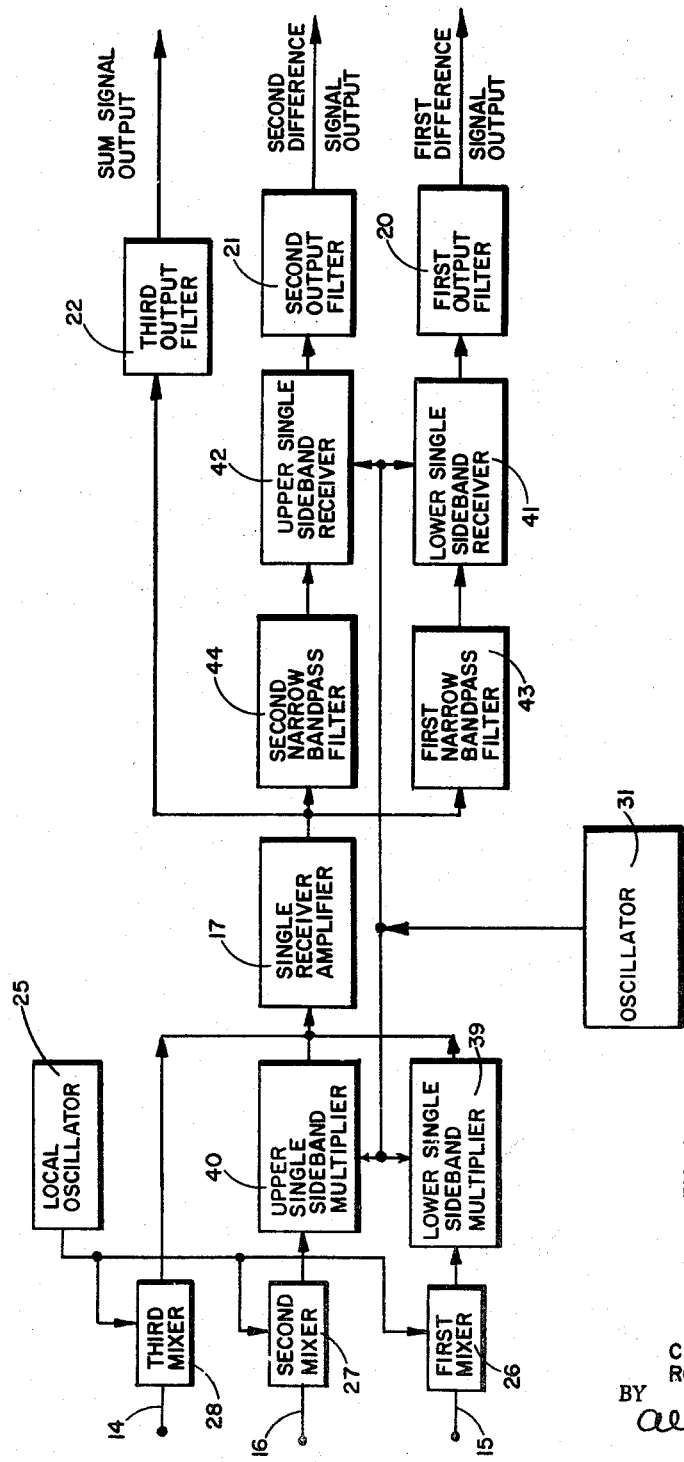
FIG. 4 is a functional block diagram of an alternate embodiment of this invention.

An alternative embodiment of the inventive concept is illustrated in FIG. 4 and employs a first and second single side band (SSB) system to accomplish frequency coding of a first and second monopulse difference signal by a modulating frequency, $-\omega_1$ and $+\omega_1$, respectively, as illustrated in FIG. 4.

Referring to FIG. 4, there is illustrated a block diagram of a second embodiment of this invention. A single receiver-amplifier 17 is responsively connected to the sum, first difference and second difference channels 14, 15 and 16 of a monopulse system. There is also provided IF means comprising elements 25, 26, 27, and 28 comprised of like components similarly arranged as like referenced elements of FIG. 2.

There is also provided means for differentially translating the two difference signals in the frequency domain relative to the sum signal and relative to each other. Such means is comprised of first and second single side band multipliers 39 and 40, both of said multipliers being responsively connected to a cosine signal generator 31. Each of first and second single side band multipliers 39 and 40 is comprised of a pair of balanced modulators and phase rotation means arranged for oppositely shifting the frequency of one of the two IF difference signals $F_1(\omega_c)$ and $F_2(\omega_c)$ by an amount equal to the frequency $\omega_1$ of signal generator 31, whereby a relative frequency shift of an amount $2\omega_1$ is achieved between the two difference signals.

For example:

$$F_1(\omega_c)e^{-j\omega_1 t} = F_1(\omega_c - \omega_1)$$

$$F_2(\omega_c)e^{+j\omega_2 t} = F_2(\omega_c + \omega_1)$$

Such devices for achieving only a single side band (e.g., $e^{+j\omega t}$ or $e^{-j\omega t}$) are well known to those skilled in the art and are described in the literature, for example, at page 43 of RCA Review, March 1955 Issue, in an article entitled "A Phase Rotating Single Side Band Generating System" by J. R. Hall. Because such devices are known in the art, multipliers 39 and 40 are shown in functional block diagram form only.

Because one multiplier provides a lower sideband signal and the other multiplier provides an upper sideband signal (e.g., $F_1(\omega_c - \omega_1)$ and $F_2(\omega_c + \omega_1)$, for example), the required bandwidth of receiver amplifier 17 of FIG. 4 is the same as that for the like element of FIG. 2.

The output of single amplifier 17 is severally fed to first, second, and third output filters 20, 21, and 22 for separately recovering an exclusive one of the sum, first difference and second difference signals. The function of third output filter 22, for example, is to distinguish and pass only a signal having the frequency of the IF sum component of the combined output from amplifier 17, and reject other frequency components of such output.

A first and second single sideband receiver 41 and 42 are interposed between the output of amplifier 17 and first and second output filters 20 and 21 respectively. Each of first and second single sideband receivers 41 and 42 is comprised of means arranged for oppositely shifting the frequency of one of the two IF difference signals, $F_1(\omega_c-\omega_1)$ and $F_2(\omega_c+\omega_1)$ by an amount equal to the frequency $\omega_1$, whereby an output component of element 41 is one difference signal at the IF carrier frequency ($F_1(\omega_c)$) and an output component of element 42 is the other difference signal at the IF carrier frequency ($F_2(\omega_c)$). Each such single sideband receiver may be comprised of a pair of balanced modulators and phase rotation means arranged for oppositely shifting the frequency of an input signal by an amount $\omega_1$ whereby a sum signal component $F_3(\omega_c)$ is shifted to $F_3(\omega_c-\omega_1)$ in one such receiver and to $F_3(\omega_c+\omega_1)$ by the other such receiver. These receivers are similar in structure to multipliers 39 and 40, and, are of the type more particularly described in the previously mentioned RCA Review article. Further, such frequency shift by one such receiver (say, element 41), is opposite to the shift produced by the associated single sideband multiplier (element 39) whereby the difference signal output from such multiplier is shifted back to the IF carrier frequency $\omega_c$.

First and second narrow bandpass filters 43 and 44 are interposed between the output of amplifier 17 and first and second single sideband receivers 41 and 42 respectively, in order to better effect signal separation, as will be explained hereinafter more fully.

Where a common single sideband multiplier frequency $\omega_1$, radians/sec. is selected as $$\frac{2\pi}{T}$$

it is to be appreciated from FIG. 3 that the harmonics of the first and second difference signals generated by first and second single sideband multipliers 39 and 40 tend to be mutually compensating. Recalling that each of sideband multipliers 39 and 40 produces a mutually exclusive single frequency (e.g., one produces $(\omega_c+\omega_1)$ and the other produces $(\omega_c-\omega_1)$, but neither produces both) the transport of a first difference signal $F_1(\omega_c)$ through multiplier 39 will produce only a single spectral component of the first difference signal. Referring to FIG. 3, this spectral component, say $g_1(\omega_c-\omega_1)$ indicated by curve 37, will be centered at one side of the carrier frequency $f_c$, say at $$-\frac{2}{T}$$

Therefore, as may be seen from curve 37 of FIG. 3 a single first difference signal spectral component will lie within the spectral region $$-\frac{1}{T} \text{ and } +\frac{1}{T}$$

which region also contains the desired sum signal to be detected. Similarly, transport of the second difference signal $F_2(\omega)$ through multiplier 40 will produce only a single spectral component of the second difference signal. This spectral component, say $g_1(\omega_c+\omega_1)$ will be centered at the opposite side of the carrier frequency $f_c$ at $$+\frac{2}{T}$$

indicated by curve 38 of FIG. 3. The single spectral component of the second difference signal lying within the spectral region $$-\frac{1}{T} \text{ and } +\frac{1}{T}$$

is seen to be generally of equal amplitude and opposite sense to the spectral component of the first difference signal. Hence, the spectra of the first and second difference signals from multipliers 39 and 40 respectively tend to mutually cancel each other in the frequency region, $$\left(f_c \pm \frac{1}{T}\right)$$

Accordingly, crosstalk in the sum signal output of FIG. 4 due to harmonics of the two difference signals is minimized when the upper and lower single sideband frequency equals $$\frac{2}{T}$$

cycles per second.

Recalling that each of sideband receivers 41 and 42 produces only a single frequency (e.g., either $(\omega_c+\omega_1)$ or $(\omega_c-\omega_1)$ but not both) the transport of a sum signal $F_3(\omega_c)$ through one of the two single sideband receivers 41 and 42 would produce only a single spectral component of the sum signal. Referring to FIG. 3, this spectral component would be centered at one side or the other of carrier frequency $f_c$. Therefore, an uncompensated sum signal spectral component would lie within the spectral region $$-\frac{1}{T} \text{ and } +\frac{1}{T}$$

which also contains the desired difference signal component to be detected. Such phenomena arises regardless of the value selected for $\omega_1$. Accordingly, a narrow bandpass filter, having a center frequency tuned to the sideband of interest (e.g., either $(\omega_c+\omega_1)$ or $(\omega_c-\omega_1)$) is employed at the input to each of single sideband receivers 41 and 42.

It is to be seen that while the embodiment of FIG. 4 performs the same function as that of FIG. 2, the device of FIG. 4 requires twice as many balanced modulator components, plus two narrow bandpass filters. Not only are narrow bandpass filters made necessary by the device of FIG. 4, but the performance of the system of FIG. 4 will be deteriorated by the "ringing" associated with bandpass filters of extremely narrow bandpass or "high Q." Such high Q is required where the bandwidth between the several sidebands and center frequency is small (e.g., $\omega_1$ approaches zero). If, however, the bandwidth between the several sidebands and center frequency is too broad (e.g., the value selected for $\omega_1$ is large), then the required bandwidth for IF receiver 17 becomes prohibitively large, and subject to excess noise in the output. Further, the concept of the system of FIG. 4 does not readily lend itself to application for processing a single sum and difference signal because the harmonics of the single side band spectra of a single difference signal are not compensating in the region between $$-\frac{1}{T} \text{ and } +\frac{1}{T}$$

In other words single difference signal crosstalk would occur in the sum signal output.

It will be seen that the device of this invention provides improved means for reducing the differential gain and phase errors of a three signal monopulse system.

Although the invention has been described and illustrated in detail, it is clearly to be seen that the same is by way of illustration and example only and is not to be taken by way of limitation, the spirit and scope of this invention being limited only by the terms of the appended claims.

We claim:

1. A monopulse system comprising in combination: means for transmitting a substantially rectangular energy pulse, receiving reflections of said pulse and providing a first, second and thitrd source of azimuth error, elevator error and sum signals respectively having a mutually similar IF carrier; a single receiver-amplifier responsively connected to said sources, first and second complex multiplication means interposed between said receiver-amplifier and said first and second source respectively and responsively coupled to a common source of modulating frequency; said single receiver having a bandwidth $\Delta f$ (in cycles per second) equal to $$\pm\left(\frac{\omega_1}{\pi}+\frac{2}{T}\right)$$

where $\omega_1$ is the modulating frequency (in radians per second) of said multiplication means and T is the duration in seconds of a rectangular pulse of said monopulse system; first, second and third bandpass output filters responsively connected to said receiver, each said filter having a bandpass equal to $$\frac{2}{T}$$

cycles per second, and first and second demodulating means interposed between said receiver-amplifier and said first and second output filters respectively and responsively coupled to said common source, said modulating frequency being an integer multiple of $$\frac{2\pi}{T}$$

2. A monopulse energy system, comprising an antenna having a multilobe radiation pattern, a transmitter for energizing the antenna with pulses of energy of a predetermined frequency, means responsive to the antenna for combining energy received in different antenna lobes to provide a separate signal source of each of a sum signal and elevation and azimuth error signals, said signals having mutually similar IF carriers; single common means for shifting the signals from two of said sources in the frequency domain relative to the signal from the third of said sources; quadrature time-phase means responsive to said single common means for providing a time-phase quadrature relation between said two signals; a single receiver-amplifier connected to be continuously and concurrently responsive to the signal from said third signal source and said frequency-shifted two signals between which a time-phase quadrature relation exists; first, second and third bandpass filters, each of said filters having a common bandpass which includes the frequency of said carrier and being responsively connected to said receiver-amplifier; first phase-sensitive demodulation means being interposed between said amplifier-receiver and said first filter for providing an output at said first filter indicative of the output of one of said two signal sources, second phase-sensitive demodulation means being interposed between said amplifier-receiver and said second filter for providing an output at said second filter indicative of the output of the other of said two signal sources, and whereby the output from said third filter is indicative of the output from said third signal source; and wherein the monopulse system employs pulses having a pulse time duration of T seconds, and wherein further the single common means shifts the signals in the frequency domain by an amount $\pm f_1$ c.p.s. which amount $f_1$ equals $$\frac{2}{T}$$

3. A monopulse energy system, comprising an antenna having a multi-lobe radiation pattern, a transmitter for energizing the antenna with pulses of energy of a predetermined frequency, means responsive to the antenna for combining energy received in different antenna lobes to provide a separate signal source of each of a sum signal and elevation and azimuth error signals, said signals having mutually similar carriers; a single receiver-amplifier responsively connected to said sources and having a bandwidth $$\Delta f = \frac{\omega_1}{\pi} + \frac{2}{T}$$

where $\omega_1$ is the modulation frequency in radians per second, T is the duration in seconds of a rectangular pulse of transmitted energy; first, second, third and fourth cosine multipliers; a synchronized source of a first and second modulating signal having a common frequency differing from said carrier frequency and between which modulating signals a time-phase quadrature relation exists; first, second, and third bandpass output filters each having a bandpass equal to $$\frac{2}{T}$$

cycles per second; said filters being responsively connected to the output of said receiver-amplifier; said first multiplier being interposed between said first signal source and said receiver-amplifier and responsively connected to said first modulating output signal from said synchronized source; said second multiplier being interposed between said second signal source and said receiver-amplifier and responsively connected to said second modulating output signal from said synchronized source; said third multiplier being interposed between said receiver-amplifier and said first output filter and responsively connected to said first modulating output signal from said synchronized source; said fourth multiplier being interposed between said receiver-amplifier and said second output filter and responsively connected to said first modulating output signal from said synchronized source.

4. The claimed device of claim 3 in which the modulation frequency in radians per second is equal to $$\frac{2\pi}{T}$$

5. A monopulse energy system, providing a separate signal source of each of a first and second signal and a reference signal, said signals having mutually similar carriers and a mutually similar pulse time duration of T seconds; a single receiver-amplifier responsively connected to said sources; first, second, third and fourth cosine multipliers; a synchronized source of a first and second modulating signal having a common frequency $f_1$ which is an integer multiple of $$\frac{2}{T}$$

and between which modulating signals a time phase quadrature relation exists; first, second and third bandpass output filters each having a bandpass equal to $$\frac{2}{T}$$

cycles per second, said filters being responsively connected to the output of said receiver-amplifier, said first multiplier being interposed between said first signal source and said receiver-amplifier and responsively connected to said first modulating output signal from said synchronized source; said second multiplier being interposed between said second signal source and said receiver-amplifier and responsively connected to said second modulating output signal from said synchronized source; said third multiplier being interposed between said receiver-amplifier and said first output filter and responsively connected to said first modulating output signal from said synchronized source; said fourth multiplier being interposed between said receiver-amplifier and said second output filter and responsively connected to said first modulating output signal from said synchronized source, said receiver having a bandwidth $$\Delta f = \mp (\eta+1)\frac{2}{T}$$

where $\eta$ is an integer number.

6. A monopulse energy system, providing a separate signal source of each of a first and second signal and a reference signal, said signals having mutually similar carriers and a mutually similar pulse time duration of T seconds; a single receiver-amplifier responsively connected to said sources; first, second, third and fourth cosine multipliers; a synchronized source of a first and second modulating signal having a frequency which is an integer multiple of $$\frac{2}{T}$$

and between which modulating signals a difference frequency relation $$\frac{2}{T}$$

exists; first, second and third bandpass output filters each having a bandpass equal to $$\frac{2}{T}$$

cycles per second, said filters being responsively connected to the output of said receiver-amplifier; said first multiplier being interposed between said first signal source and said receiver-amplifier and responsively connected to said first modulating output signal from said synchronized source; said second multiplier being interposed between said second signal source and said receiver-amplifier and responsively connected to said second modulating output signal from said synchronized source; said third multiplier being interposed between said receiver-amplifier and said first output filter and responsively connected to said first modulating output signal from said synchronized source; said fourth multiplier being interposed between said receiver-amplifier and said second output filter and responsively connected to said first modulating output signal from said synchronized source, said receiver having a bandwidth equal to the highest modulating signal frequence plus $$\frac{2}{T}$$

cycles per second.

7. In a monopulse system including means for providing a reference sum channel and a difference channel passing signals having mutually similar carriers and a mutually similar pulse time duration of T seconds, the combination comprising: complex multiplication means connected to one of said channels for translating one of said signals in the frequency domain above and below the frequency of said carriers by a common modulation frequency $f_1$ cycles per second, said modulation frequency $f_1$ being equal to an integer multiple of $$\frac{2}{T}$$

a single channel receiver responsively connected to said multiplication means and the other of said channels, said receiver having a bandwidth equal to $$\pm \left( f_1 + \frac{2}{T} \right)$$

first and second bandpass output filters responsively connected to said receiver, each of said filters having a bandpass equal to $$\frac{2}{T}$$

cycles per second, and demodulation means interposed between said receiver and said first filter, said complex multiplication means and said demodulation means being operatively connected to a common single periodic function generator.

8. In a monopulse system for providing a first and second difference channel and a reference sum channel passing signals having mutually similar carriers and a mutually similar pulse time duration of T seconds, the combination comprising: a first cosine multiplier means connected for translating signals of said first channel in the frequency domain above and below the frequency of said carriers by a first modulation frequency $f_1$ cycles per second, said first modulation frequency $f_1$ being equal to an integer multiple of $$\frac{2}{T}$$

a second cosine multiplier means connected for translating signals of said second channel in the frequency domain above and below the frequency of said carrier by a second modulation frequency $f_2$ cycles per second, said second modulation frequency $f_2$ being equal to an integer multiple of $f_1$, a single channel receiver responsively connected to said first and second cosine multiplier means and to said reference channel, said receiver having a bandwidth equal to $2f_2$, first and second output filters responsively connected to said receiver, each said filter having a bandpass equal to $$\frac{2}{T}$$

cycles per second, first and second demodulation means interposed between said receiver and said first and second filter respectively, said first and second multiplication means and said first and second demodulation means being operatively connected to a single common periodic function generator, and a harmonic generator interposed between the output of said periodic function generator and the input to said second multiplier means and to said second demodulation means for providing an operating frequency signal thereto equal to $f_2$ cycles per second.

References Cited by the Examiner
UNITED STATES PATENTS

| | | | |
|---|---|---|---|
| 2,693,590 | 11/54 | Schmitt | 343—16.1 |
| 2,988,739 | 6/61 | Hoefer et al. | 343—16 |
| 2,995,750 | 8/61 | Holcomb et al. | 343—16.1 |
| 3,141,164 | 7/64 | Holcomb et al. | 343—16 |

OTHER REFERENCES

A Monopulse Instrumentation System, Proceedings of the IRE; August 1961, page 1328.

CHESTER L. JUSTUS, *Primary Examiner.*